(12) United States Patent
Kratzer et al.

(10) Patent No.: US 11,089,031 B2
(45) Date of Patent: Aug. 10, 2021

(54) METHODS FOR SWITCHABLE MATRIX BARCODES FOR SECURE WEBSITE ACCESS

(71) Applicant: VERSATILE CREDIT, INC., Mechanicsburg, PA (US)

(72) Inventors: William Kratzer, Harrisburg, PA (US); Joe Sharp, Mifflinburg, PA (US); Sam Miller, Mechanicsburg, PA (US); Alec Okopal, Mount Airy, MD (US)

(73) Assignee: VERSATILE CREDIT, INC., Mechanicsburg, PA (US)

( * ) Notice: Subject to any disclaimer, the term of this patent is extended or adjusted under 35 U.S.C. 154(b) by 0 days.

(21) Appl. No.: 17/036,720

(22) Filed: Sep. 29, 2020

(65) Prior Publication Data

US 2021/0112072 A1 Apr. 15, 2021

Related U.S. Application Data

(60) Provisional application No. 62/913,346, filed on Oct. 10, 2019.

(51) Int. Cl.
*H04L 29/06* (2006.01)
*G06F 16/955* (2019.01)
*G06K 7/14* (2006.01)

(52) U.S. Cl.
CPC ........ *H04L 63/108* (2013.01); *G06F 16/9554* (2019.01); *G06F 16/9566* (2019.01); *G06K 7/1417* (2013.01); *H04L 63/0853* (2013.01)

(58) Field of Classification Search
CPC .............. H04L 63/108; H04L 63/0853; G06F 16/9554; G06F 16/9566; G06K 7/1417
See application file for complete search history.

(56) References Cited

U.S. PATENT DOCUMENTS

| | | | |
|---|---|---|---|
| 8,677,116 B1* | 3/2014 | Bicer | H04L 63/0853 713/155 |
| 2014/0047524 A1* | 2/2014 | Auger | H04L 63/08 726/7 |
| 2015/0032578 A1* | 1/2015 | Bicer | H04L 63/18 705/26.82 |
| 2017/0019400 A1* | 1/2017 | Drolshagen | H04W 12/06 |
| 2019/0228178 A1* | 7/2019 | Sharma | G06K 19/0723 |

* cited by examiner

*Primary Examiner* — Khoi V Le
(74) *Attorney, Agent, or Firm* — Saul Ewing Arnstein & Lehr LLP

(57) ABSTRACT

Methods for switchable matrix barcodes for secure website access is described herein. In one aspect, a method of accessing a secure webpage by a user device can include scanning a first switchable matrix barcode by the user device; identifying a first URL sequence unique to the first switchable matrix barcode based on a deconstruction of the first switchable matrix bar code; and accessing a webpage corresponding to the first URL sequence based at least on whether the accessing occurs within a predefined expiration period of the first URL sequence.

8 Claims, 3 Drawing Sheets

METHODS FOR SWITCHABLE MATRIX BARCODES FOR SECURE WEBSITE ACCESS

CROSS-REFERENCE TO RELATED APPLICATION

This application claims priority under 35 U.S.C. § 119(e) of U.S. Provisional Patent Application Ser. No. 62/913,346, filed Oct. 10, 2019. The entire content of this application is hereby incorporated by reference herein.

FIELD OF THE INVENTION

The invention relates to the field of software technology. In particular, the invention relates to a process for facilitating consumer credit applications on a mobile device, while ensuring that the consumer still applies on-site, in the store.

BACKGROUND OF THE INVENTION

Conventional in-store devices such as free-standing and table-top kiosks have been used to allow a consumer to apply for credit in a self-service manner. These kiosks can collect consumers' personal information to complete and submit an electronic application for credit. This collected information can be securely sent to a single (or sometimes, a plurality of) lending partner(s) for approval. Lending partners can use the collected information to score and make a decision on the credit application, and to further provide immediate feedback to the consumer within a near instantaneous period of time (e.g., in a matter of seconds). Providing easy and instant access to credit creates a positive shopping experience and generally results in higher average sales for the retailer and higher utilized credit for the lenders.

Since those beginnings, a variety of other application channels have become available to consumers. Conventional credit application platforms have also been extended to include in-store, web-based terminals and mobile tablets. Additionally, conventional web-based platforms can allow consumers to apply at home, using personal computers or mobile devices.

Many lenders make decisions on credit applications differently based on the channel used by the consumer. For example, in-store credit applications (e.g., at a sales terminal or a dedicated kiosk) can be evaluated differently than a consumer applying from the retailer's e-commerce site, where the consumer can be applying at home.

Typically, "out-of-store" channels are decisioned more strictly due to concerns around fraud. Forcing a user to be "in the store" during the application process mitigates fraud concerns and provides the consumer with the best opportunities to get approved for credit.

At the same time, more and more consumers carry sophisticated mobile devices with internet connectivity and feature-rich web browsers. These highly personal devices provide a secure and safe credit application experience for the consumer. Retailers also benefit from consumer use of personal devices because it means less expenditures and valuable floor space dedicated to in-store self-service kiosk stations. Finally, the average consumer is becoming more and more educated every day on the dangers of entering information on "public machines". While credit application kiosks are secure devices, companies cannot afford to ignore the fact that more and more consumers will continue to demand to keep personal information limited to their secured personal devices, which can offer state-of-the-art encryption and multi-factor authentication using biometrics, and the like.

While there exists a desire to move more and more credit applications through a mobile channel, lenders are concerned about the fraud and risk components with mobile credit applications as there exists no way to ensure that the user applying is physically located in the store. Retailers also prefer to have the most flexible decisioning criteria applied to their customers to ensure that their customers can get the best financing offers.

There is also friction associated with getting the consumer to access a website on their mobile that can be used for processing a credit application. Website links can be long and difficult type.

Finally, while mobile devices have the ability to share their location when applying for credit, this mechanism is problematic. First, location services are possible to spoof (for fraud) and sometimes not accurate or granular depending on GPS coverage. Also, more and more consumers are becoming educated on the dangers of sharing their actual location with another vendor or business entity as location tracking is largely seen as an unseemly business practice.

SUMMARY OF THE INVENTION

Methods for switchable matrix barcodes for secure website access is described herein. In one aspect, a method of accessing a secure webpage by a user device can include scanning a first switchable matrix barcode by the user device; identifying a first URL sequence unique to the first switchable matrix barcode based on a deconstruction of the first switchable matrix bar code; and accessing a webpage corresponding to the first URL sequence based at least on whether the accessing occurs within a predefined expiration period of the first URL sequence.

This aspect can have a variety of embodiments. In one embodiment, the accessing can occur subsequent to the predefined expiration period expiring, and where the accessed webpage can include an access denied webpage.

In some cases, the method can further include scanning a second switchable matrix barcode by the user device, where the second switchable matrix barcode replaces the first switchable matrix barcode subsequent to the expiration of the predefined expiration period; identifying a second URL sequence unique to the second switchable matrix barcode based on a deconstruction of the second switchable matrix barcode; and accessing the secure webpage corresponding to the second URL sequence based on the accessing occurring prior to an expiration of a second predefined expiration period.

In another embodiment, the accessing can occur prior to the predefined expiration period expiring, and where the accessed webpage comprises the secure webpage. In some cases, the secure webpage can further include a consumer credit application.

In another embodiment, the first URL sequence can further include at least a first access token for accessing the secure website, and a website address for the secure website.

In another embodiment, the first switchable matrix barcode can include a Quick Response (QR) code.

In another aspect, a method of displaying a set of switchable barcodes can include determining, by a computing device, a set of access tokens for accessing a secure website; generating, by the computing device, a first switchable matrix barcode unique to one of the set of access tokens; and displaying the first switchable matrix barcode for a predefined expiration period.

This aspect can have a variety of embodiments. In one embodiment, the method can further include determining the predefined expiration time period expires; generating a second switchable matrix barcode unique to another of the set of access tokens; and displaying the second switchable matrix barcode based on the determined expiration.

In another embodiment, determining the set of access tokens can include receiving the set of access tokens from an external device.

In another embodiment, determining the set of access tokens can include receiving a seed access token from an external device; and identifying the set of access tokens from the seed access token and an access token generation process.

In another embodiment, generating the first switchable matrix barcode can further include embedding a first URL sequence within the first switchable matrix barcode, where the first URL sequence can include at least the first access token and a website address for a secure webpage.

In another embodiment, the first switchable matrix barcode can include a QR code.

DETAILED DESCRIPTION OF THE INVENTION

Figure 1:
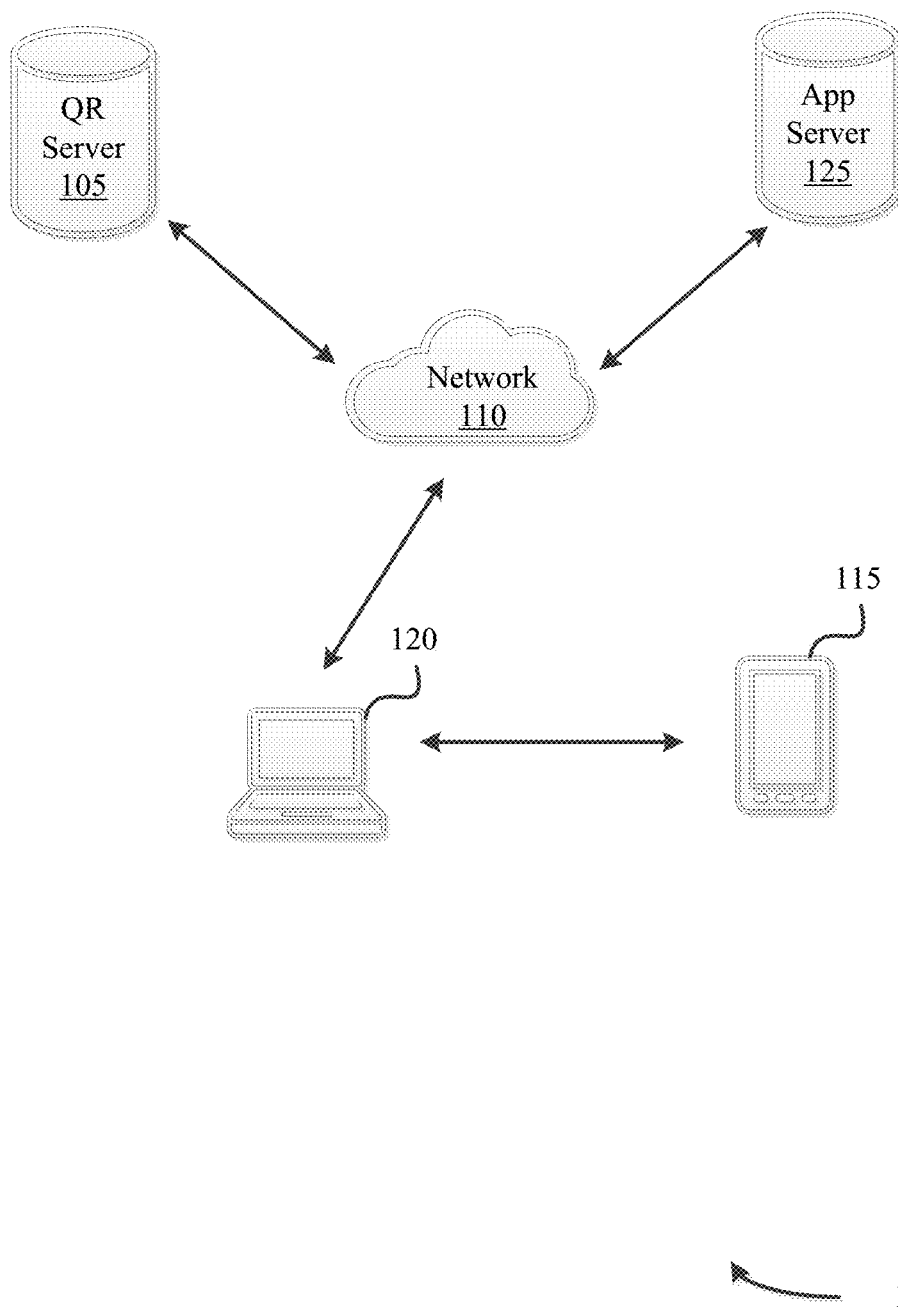
FIG. 1 is a system for switchable matrix barcodes for secure website access, according to an embodiment of the claimed invention.

A solution is needed where a consumer can quickly and easily start a credit application on their phone, while giving the lender a reasonable assurance that said credit application is taking place within a specific retail location. Applicant proposes a solution that can utilize the strengths of mobile technology, in-store technology, and cryptography to create such an experience. The solution outlined in this document describes a system where a dynamic matrix barcode can be generated and rapidly switched on a computer display. A consumer can scan the matrix barcode to be taken to a website to initiate a credit application. The term "switch" as used herein describes the display of a barcode and subsequent replacement of the barcode with another barcode on the display.

This solution can have the following benefits:
1. It can allow the consumer to use their secure, trusted mobile device to apply for credit.
2. The matrix barcode can remove the friction associated with typing in a long web address on their mobile device. The consumer can simply scan the matrix barcode to instantly navigate to the site.
3. The consumer's mobile device provides a private credit application experience where a rejection or declined decision from the lender does not result in an embarrassing situation between the consumer and the retailer.
4. The consumer's mobile device can be able to quickly "autofill" common fields in a credit application, including name, address, email, phone number. Many mobile devices allow the user to quickly "autofill" these fields. This results in a quicker, frictionless, and more accurate data entry experience.
5. The lender can have a reasonable guarantee that the applicant is applying on-site, at the retailer's location where fraud is much less likely to occur. This allows for a more lenient and successful credit decisioning process.
6. The solution can further provide a contactless experience for the consumer. The solution can allow for the consumer to physically interact with his or her own mobile device or other personal technology, which can help mitigate the spread of disease.

Dynamic Matrix Barcode

A Quick Response (QR) code is a 2-dimensional matrix barcode that can be scanned by a number of different devices. Most mobile phones natively support scanning QR codes. The phone's camera application automatically recognizes the QR code and decodes the information stored in the code. QR codes can store any type of text data. One common use of QR Codes is to direct consumers to websites (e.g., Uniform Resource Locators (URLs)) for marketing purposes or consumer engagement purposes.

An access token for accessing a secure website can be embedded within a URL. An access token can be dynamic in nature (e.g., a randomized sequence of alphanumeric characters) and can be valid for a short period of time. The dynamic nature of the QR Code (changing very frequently) is driven by the fact that a new "access token" is encoded into the web site address on a regular frequency (for example: every three seconds, every five seconds, and the like).

When a consumer scans the dynamically changing QR Code, the consumer can be directed to the website address encoded into the matrix barcode. The website address is a web-server that will validate the "access token" encoded into the website address (URL). If the access token is deemed to be valid, the consumer is shown the application for credit. If the access token is deemed to be invalid, the consumer can be shown a web page that directs them to contact the in-store sales associate. The access token can be a true authentication token in that the consumer can only access the application for credit if a valid access token is encoded into the URL.

The validation features of the access token can include:
The access token must be a valid agreed-upon token between the computer generating the Matrix barcode and the web-server. In software engineering and computer science, there are many well-known techniques for orchestrating this type of agreement between a client and a server. A few representative techniques will be outlined in this document for illustrative purposes.
The access token can only be valid for a certain amount of time. For example: An access token displayed on the screen can only be valid for 30 seconds, such as from Aug. 28, 2019 3:10:05 PM ET to Aug. 28, 2019 3:10:35 PM ET.
The access token can only be used a certain number of times. For example, the link represented in the matrix barcode (with the embedded access token) can only be used once. Any repeated uses of the link can direct the consumer to see a sales associate for further assistance. In this cases, the first use of the access token immediately invalidates the access token from any future use.

These validation properties prevent:

A random access token being created (and used) by a malicious user (since all access tokens can be long, unique, and validated by the web-server).

Snapping a picture of the matrix barcode and sharing the credit application link onsite and sending it to a malicious actor, offsite. Since the codes can be extremely time-sensitive and short-lived.

Snapping a picture of the matrix barcode and sharing the credit application link to be used repeatedly off-site by a group of fraudulent actors, as these links can only be used once.

Because the matrix barcodes can be dynamically changing rapidly (for example, every three seconds, every five seconds, and the like), access tokens that have a short "expiration" time period can be used and it prevents multiple consumers from taking a picture of the same matrix barcode (since they can be one-time-use).

Additionally, different digital displays can show different matrix barcodes to represent different lending configurations and to provide intelligence for the retailer to know which departments and stores are driving lending decisions. For example, the matrix barcodes generated in the mattress section of a department store can be different and unique from the matrix barcodes generate in the electronics section of the same department store (or event at different retail location).

Additionally, different digital displays can be shown for different sales representatives so that different matrix barcodes are being used to represent unique sales associates (to track credit referrals by sales associates).

Workflow

In the following workflow, the following entities can be present in the system, such as system 100 as described in FIG. 1:

1. A consumer is an individual with a mobile device 115 capable of reading matrix barcodes (hereinafter QR Codes for the purpose of the workflow) and is interested in applying for credit-in-store, using the mobile device 115.
2. The QR Code Display is the computer screen or display showing the dynamically changing QR Code.
3. The QR Code Computer 120 is connected to the QR Code Display. The QR Code Computer 120 is connected to the Internet and has connectivity to the QR Code Server 105 (e.g., via network 110) to agree upon the exchange or generation of access tokens.
4. The QR Code Server 105 is an Internet accessible web-server that receives requests from a QR Code Computer and delivers a series of access tokens that can be immediately displayed (or derived, and then displayed) by the QR Code Computer.
5. The Credit Application Server 125 is a server that can validate QR Code access tokens and then grant access to the correctly electronic credit application to the mobile device.

Figure 2:
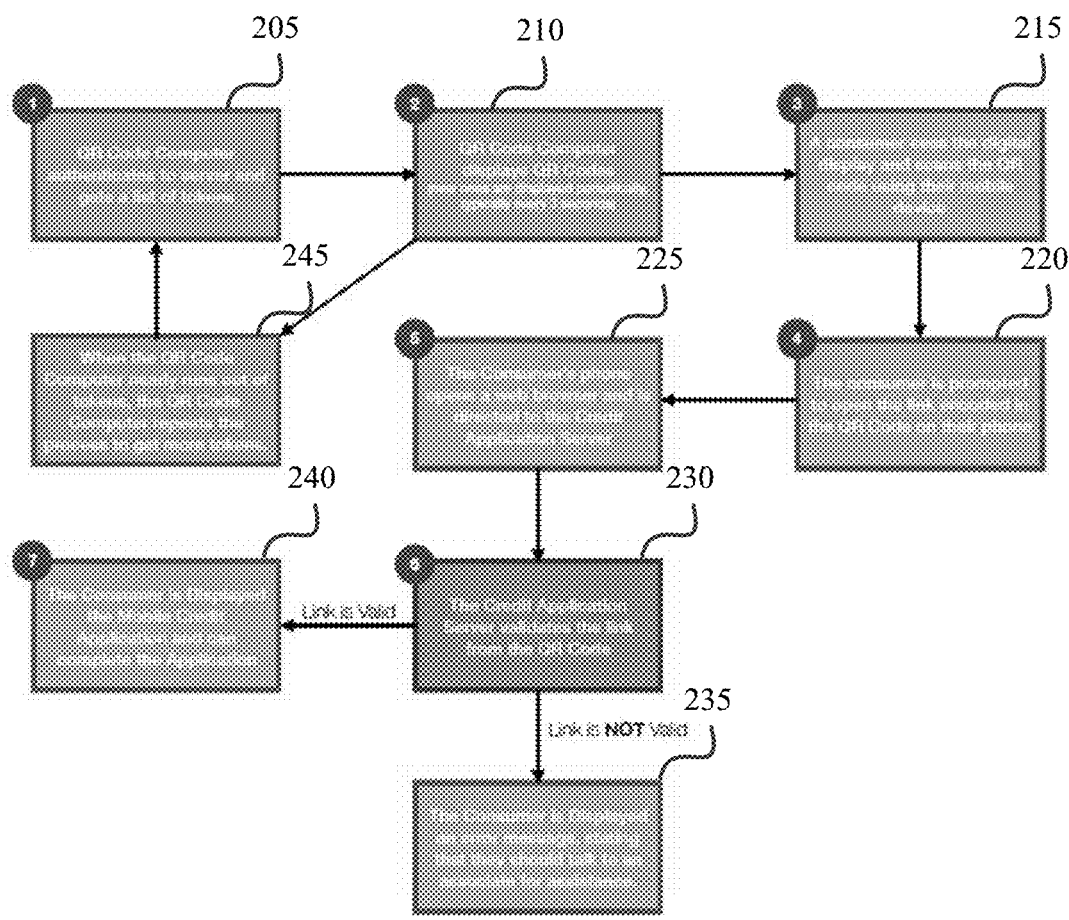
FIG. 2 is a workflow process for secure website access using switchable matrix barcodes, according to an embodiment of the claimed invention.

The following steps are representative of the working system described above, and are depicted in workflow process 200 of FIG. 2:

1. At Step 205, the QR Code Computer 120 can transmit an authenticated request to the QR Code Server to provide a list of access tokens and directions on how often to switch through the tokens. In some cases, QR Code Server 105 can optionally provide a "seed" token that the QR Code Computer 120 can use to generate a list of access tokens by itself (e.g., to eliminate the data payload requirements of sending all valid access tokens).
2. At Step 210, the QR Code Computer 120 can generate and begin displaying the web site address (URLs) with the embedded tokens immediately. The QR Code Computer 120 can modify the website URL displayed based on new tokens on a frequency established by the server outlined in Step 205.
3. At Step 245, when the QR Code Computer 120 determines that number of remaining QR Codes is below a predefined number, the QR Code Computer 120 can repeat at Step 205. If data transmission error occurs, the system may not display a dynamic QR Code, but instead can "fallback" to a static URL that can be used to allow the consumer to apply for credit (but without the guarantee that the consumer is onsite).
4. During this time, the consumer can use their mobile device 115 to scan the QR Code at Step 215. The consumer can open the link encoded in the QR Code at Step 220.
5. At Step 225, the QR Code link can direct the consumer to the Credit Application Server 125. At Step 230, the Credit Application Server 125 can parse the link, validate the access token (by communicating with the QR Code Server 105), and provide access to the credit application if the access token is valid. Validation of the access token can include:
   a. Performing a lookup of the access token to ensure that it is valid.
   b. Ensuring that the access token hasn't expired. For example, ensure that that access token isn't more than "30 seconds old".
   c. Ensuring that the access token hasn't been used before.
6. If the access token is valid, the Credit Application Server 125 at Step 235 can display and render the web user interface for the "in store" credit application (with all of the benefits of applying in store).
7. If the access token is invalid, the Credit Application Server 125 at Step 240 can display and render an error message to the consumer that they should contact a sales associate for further assistance.

Example QR Codes Link

Figure 3:
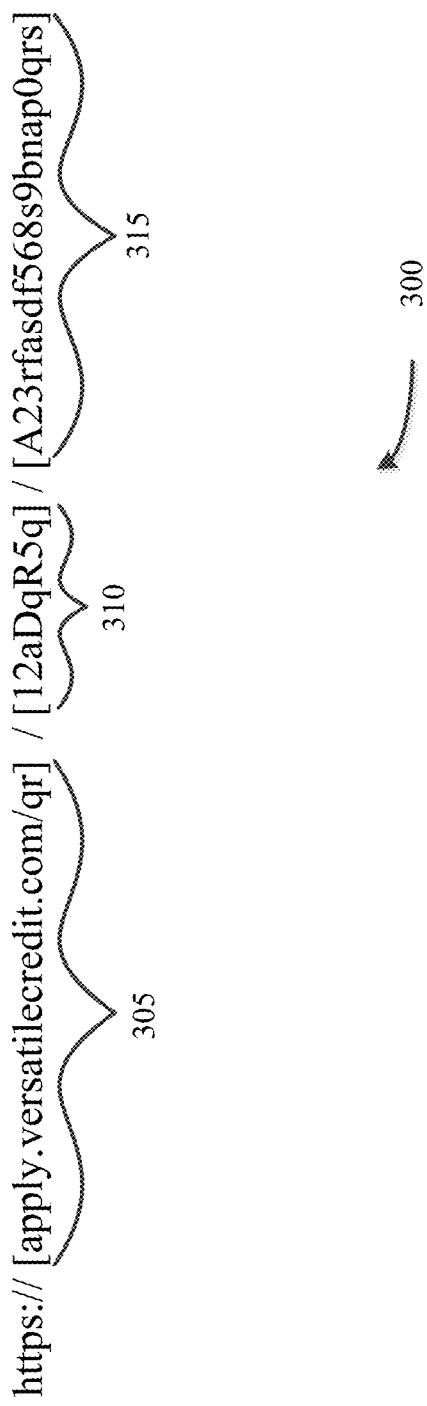
FIG. 3 is an example website link implementing switchable barcodes, according to an embodiment of the claimed invention.

FIG. 3 depicts an exemplary website link 300 implementing switchable matrix barcodes according to an embodiment of the claimed invention. The website link 300 can include a site and server representation 305, a device identifier 310, and an access token 315.

The site and server representation 305 can include information related to the identified site(s) and server(s) that manage the incoming QR Code link requests. For example, "qr" can correspond to a specific server tasked with managing QR Code link requests. The device identifier 310 can represent a unique device identifier that is distinguishable by the QR Code Computer. In some cases, this device can be used to specify the retailer, the location inside the store (if there are multiple QR Code Computers and Displays) and even the sales representative that is associated with the display. The access token 315 can represent a unique, short-lived access token associated with the QR Code.

Methods of Receiving Links

Explicit:

The QR Code Computer 120 can query the QR Code Server 105 to obtain a list of access tokens that can be used immediately and switched every 5 seconds. For example: 120 access tokens can be returned, which can provide ten minutes of access tokens (120 tokens*5 seconds=600 seconds or 10 minutes) before a new set needs to be queries. These links can be time-sensitive and synchronized with the QR Code Server 105.

Derivative:

The QR Code Computer 120 can query the QR Code Server 105 to obtain a "seed" access token that can be used to generate a new list of access tokens by the computer. For example, the QR Code Server 105 can send a seed value of 596f32eada13-4ea8-910c-9582eabb28ee. The QR Code Server 105 can indicate to the QR Code Computer 120 that this seed value can be used to generate 200 tokens that can be switched every 5 seconds for 10 minutes of display time, for example. Nearing 10 minutes (e.g., 9 minutes and 50 seconds, etc.), the QR Code Computer 120 can re-query to receive another seed.

To generate a list of access tokens from this seed value, the QR Code Computer 120 can use this seed value to iteratively run a cryptographic hash with the seed value (or previous hash) as the input.

For example:
Access Token #1=Hash(seed) or Hash(596f32ea-da13-4ea8-910c-9582eabb28ee)
Access Token #2=Hash(Access Token #1)
Access Token #3=Hash(Access Token #2)
Etc. . . .

A variant of this hash-derivation model may also include a salt. The salt would be a random string that is shared between the QR code Server 105 and the QR code Computer 120 that is used in the derivation process. The salt is used in the hash function below. The use of the private salt prevents the end-user from retrieving a access token and sequentially hashing it themselves.

For example:
Note: μ means string concatenation
Assuming a salt of: A712bqw1rfhlasg
Assuming a seed value of: 596f32ea-da13-4ea8-910c-9582eabb28ee
Access Token #1=Hash(salt‖seed) or (A712bqwlrfhlasg596f32ea-da13-4ea8-910c-9582eabb28ee)
Access Token #2=Hash (salt‖Access Token #1)
Access Token #3=Hash (sal‖Access Token #2)
Etc. . . .

The QR Code Server 105 and the QR Code Computer 120 can agree upon the hashing algorithm to be used to derive the access tokens. Both the QR Code Computer 120 and QR Code Server 105 can execute this derivation algorithm to generate the same matching list of access tokens. This can allow the QR Code Server 105 and QR Code Computer 120 to maintain valid lists of access tokens used during the validation process. Many hashing (or message digest) algorithms are well-known in the fields of computer science and software engineering. Examples of hashing algorithms include: MD5, SHA-1, SHA-256, etc.

Example QR Code Computer Request

The following web service request is illustrative of the type of information that can be made in a request from the QR Code Computer 120 to the QR Code Server 105. The request below is represented as JSON (JavaScript Object Notation) for illustration purposes.

```
{
    "device_id": "1234-5678-1234-5678-8765-4321",
    "authentication_key": "596f32ea-da13-4ea8-910c-9582eabb28ee"
}
```

The device ID can represent a unique device, deployed for a unique retailer, at a unique store location, inside of a unique department within the store, for a unique sales associate, etc. The authentication key can represent authentication credentials required to access the service so that random, rogue parties cannot use the service to generate their own access tokens.

The following web service response is illustrative of the type of information that can be exchanged in a response to the QR Code Computer 120 to the QR Code Server 105. The request below is represented as a JSON-encoded request for illustration purposes.

```
{
    "base_url": "https://apply.versatilecredit.com/qr/12aDqR5q/",
    "token_frequency_seconds": 5,
    "token_count": 120,
    "Tokens": [
        "275e1a72-9edc-47c5-b1b4-84e28ec00819",
        "Ab9cc177-9df2-430e-a99e-764f0c753cef",
        ... 117 access tokens removed for brevity ...
        "ab2e66a7-7142-4dc9-8bc6-76ced2a5327d"
    ]
}
```

The base URL can represent the front part of the URL. The QR Code can be the concatenation of the base URL with the access token. The token frequency can instruct how quickly these dynamic tokens can be switched (in this case, every 5 seconds). The token count can represent how many tokens are in the payload (in this example, 100 tokens are listed). The list of 100 tokens that can be displayed by the QR Code Computer 120. The QR Code Computer 120 can start displaying these codes immediately and in the order list due to the time-sensitive nature of the access tokens.

Alternatively, the QR Code Server 105 can reply with a seed and a salt to be used for derivation purposes:

```
{
    "base_url": "https://apply.versatilecredit.com/qr/12aDqR5q/",
    "token_frequency_seconds": 3,
    "token_count": 100,
    "token_seed": "4e51e83d-d4f5-4c68-979c-9c332552c9ef",
    "token_salt": "a50f3a58-9376-434d-8295-a09451d31e96",
    "Hash_algorithm": "sha-256"
}
```

The base URL can represent the front part of the URL. The QR Code can be the concatenation of the base URL with the access token. The token frequency can instruct how quickly these dynamic tokens can be switched (in this case, every 3 seconds). The token count can represent how many tokens can be derived. The token seed can represent the seed value that can be used for the iterative hashing algorithm.

Embodiment Example

Introduction

Snap Sign™ is an innovative technology solution that combines the power of low-cost computing and dynamic QR codes to allow consumers to easily apply for financing on their own mobile phone while securely guaranteeing an in-store presence for the lender.

Business Problem

Snap Sign was developed as a technology to promote the adoption of consumer mobile devices in the retail consumer finance space. Versatile Credit has a strong belief that the future of consumer self-service lies in the power of the modern day smartphone. Today's mobile devices feature world-class security with advanced security features like biometric fingerprints, facial recognition technology, and advanced storage encryption technologies. Mobile devices are ubiquitous and are quickly becoming most consumers' only computer. Finally, mobile devices have state of the art web browser technology that empowers consumers to have both secure and rich web-based experiences. The security, ubiquity, and richness of the mobile web platform make consumer mobile devices an ideal solution for consumer self-service applications.

Traditionally, self-service consumer financing devices were strongly rooted in large, immovable, retailer-owned computing devices. Self-service devices were owned and controlled by retailers, providing the opportunity to greatly restrict, control, and secure the application environment. These devices were also located in the retailer's store, requiring consumers to engage with self-service applications while physically present inside the retailer's environment. In-store processes can also require the presentation of a physical proof of identity, such as a driver's license. It is the combination of device control and on-site presence which gave lenders a level of confidence that fraud would be mitigated on in-store self-service devices.

As technology and consumer trends have shifted toward performing more self-service activity on consumer-owned mobile devices, the lending community has struggled to deal with some of the potential fraud risks associated with this domain. Consumer-owned mobile devices, while secure, couldn't guarantee an in-store presence generally favored by the lenders. Mobile web applications, while convenient, could be accessed from anywhere in the world, allowing bad actors to remotely take advantage of scale and automation to commit fraud.

These characteristics of a consumer-owned mobile device have driven many lenders to decision credit applications more strictly due to a higher potential risk in fraud.

Lenders have attempted to solve this problem using a variety of technologies. SMS technology could be employed to send secure, one-time links to consumers who are located inside of the retail location. Further, such links could launch self-service applications that employ the use of location services to provide a strong guarantee of in-store location presence. While retailer-driven SMS technology limits the scale of remote attack, few consumers are willing to share their location data to third-party websites. As consumer interest and education in data privacy grows, the ability and success for websites to request a consumer's location will continue to diminish, limiting the effectiveness of this type of solution.

The industry needs a way to capitalize on the convenience and comfort of consumer mobile devices while providing strong guarantees that the consumer is in-store, reducing the risk of fraud. A reduced risk of fraud would benefit the consumer, retailer, and lender in more favorable credit decisioning rates.

Snap Sign is patent-pending technology from Versatile Credit that can provide a frictionless self-service experience on a consumer mobile device while delivering a strong guarantee to the lender that the consumer is in-store and a lower fraud risk.

Solution Overview

Snap Sign is a combination of traditional signage and digital signage. Snap Sign is traditional signage in the sense that the sign is plastic, sits on a table, and has printed front-matter that can be easily replaced and rotated by the retailer. The digital component of the signage is a small 2.5" display and an embedded low-cost computer that is connected to the Internet.

Snap Sign connects to the Internet through the retailer's wireless network. Snap Sign authenticates and regularly receives a list of time-sensitive web links. These web links are displayed as QR codes. The consumer simply uses their mobile device to scan the QR code and open the link with their camera application. The consumer's link is verified by Versatile before redirecting the consumer to the appropriate consumer financing application in their mobile web browser.

The QR code links displayed by Snap Sign can be time-sensitive and short-lived. Snap Sign links can be displayed only once, for a very short period of time—typically only five seconds. Additionally, these links expire after a short amount of time—typically only 20 seconds after being displayed. The links displayed on an individual Snap Sign can be unique to the specific unit that is displaying those links. This combination of link uniqueness and short-lived time-sensitivity make the link verification process a strong in-store authentication factor for the consumer.

This proof of location and in-store presence can give the lender a strong guarantee that the consumer is using the application while in-store, reducing the risk of fraud.

Snap Sign leverages the growing popularity in QR codes, as mobile phone manufacturers have built-in QR code scanning software directly into phone's native camera application. The QR code experience is both secure and frictionless for the consumer.

How It Works

While Snap Sign may look like a piece of traditional signage at first glance, it is a modern computing system with full connectivity to the Internet.

Snap Sign works by regularly requesting a large batch of time-sensitive links using web services. Versatile's servers generate batches of unique, verifiable links. Every URL generated by Versatile contains a random string to ensure that it is unique. Every URL is also valid for an extremely short time window. Finally, each URL is designated to be displayed for an even shorter period of time (typically, five seconds).

When the Snap Sign device retrieves the batch of URLs, it will start to display them according to the policy and time windows dictated by the server. Each QR code is displayed exactly when the server requested it to be displayed.

When a consumer scans a Snap Sign QR code with their mobile device, the link can be immediately opened by the consumer. Opening the unique link (containing the randomly appended string) begins a web browser session to Versatile's servers. Versatile's servers validate the link to ensure that it was generated by Versatile, and that the link has not exceeded its short expiration period. If the link has expired, the consumer's phone is redirected to a messaging page that indicates they can try again or contact a sales associate for assistance. If the link is valid, the consumer's browser session is instantly directed to the appropriately configured consumer financing application.

Physical Security

Snap Sign is designed with physical security in mind to minimize tampering and removal of the computing hardware as well as limiting access to physical ports and storage devices. The physical components of Snap Sign can include, for example:

a. 1. A Raspberry Pi 3 Model A+ miniature computer with wireless networking;

b. 2. A 2.5" touchscreen display;

c. 3. A signage stand with a built-in enclosure for the computer and display.

Snap Sign can include a solid plastic enclosure composed of 2.5 mm ABS (acrylonitrile butadiene styrene), a common plastics polymer. The enclosure contains no screws or fasteners. The Raspberry Pi computer is glued into the enclosure and attached to the signage in a way that prevents removal without employing force.

While the Raspberry Pi computer contains numerous computing ports, most of these ports can be concealed by the case enclosure. The only exposed ports on the enclosure are the power connection and the USB-A port. All other ports are inaccessible. The USB-A port is used to configure wireless networking and is discussed in further detail later in this paper (see Logical Security and Network Security for more details on how the USB-A port is secured). While the Raspberry Pi boots off of a removable compact flash card, this card is not made accessible through the sealed enclosure. For extra protection, the compact flash card is glued into the Raspberry Pi, preventing removal of the card without damage (assuming the ABS enclosure could be penetrated without damaging the device as well). Snap Sign's physical security design limits unauthorized access to the computing components.

System Security

Strong system security is in place to ensure that no remote access can be gained to the device (either on-site or off-site if the device was stolen). Snap Sign's Raspberry Pi computer runs a stripped-down version of Raspbian Linux. Industry-standard security practices can be employed to secure and harden the operating system and application software. Specifically, non-essential services can be disabled on the unit. Versatile application software runs in a non-privileged mode, under a non-privileged user. Minimal privilege escalation is only granted to perform network reconfiguration of the device. Finally, the bootloader can be configured to be non-interactive, preventing a keyboard device from being connected to the device to gain privileged systems access before the operating system loads.

The systems graphical user interface can be a minimal user interface environment consisting of a distributor provided X-Windows (X11) software installation with no window management facilities. The QR code application consists of a Chromium web browser launched full screen into a kiosk mode. These services can be started by the system and can be restarted automatically by the system in the event of an application or crash of the X-Windows subsystem. As stated above, both X-Windows and the Chromium web browser runs as a non-privileged user.

The unit uses an exposed USB-A port for network configuration. The operating system can be configured to ignore all devices that are not storage devices (including human interface devices such as mice and keyboards). This strict policy limits a bad actor's ability to connect an input device to the Snap Sign unit.

Login policies can be strict and locked down. Root (superuser) login to the device can be disabled. Password-based authentication can be disabled, requiring the use of certificate authentication (which is only used by Versatile during development). Remote login daemon services such as sshd and telnetd can be disabled on the units. Strict login policies can be essential to prevent local or network-based access to the system.

Linux's built-in firewall (iptables) can be used to limit outgoing and incoming network traffic on the unit. Versatile's quality assurance processes can include routine port scans of the Snap Sign unit to confirm that no network ports can be open and network traffic analysis to confirm that only expected network traffic is being generated by the computer. This network analysis can be performed every time a new master image is created for testing.

Network Security

Since Snap Sign requires connectivity to the Internet through the retailer's network, care is taken to ensure a protected network configuration process. Network connectivity can be configured through the exposed USB-A port. Network configuration can be loaded onto a USB storage device by the retailer or by Versatile. When a USB storage device is connected to Snap Sign, the file system can be temporarily mounted onto the device. The device can be examined for a configuration file. Network configuration files can be digitally signed by Versatile's servers with a private key. Snap Sign verifies the digital signature of the configuration with its public key. Only digitally verified configuration files can be accepted for network configuration. This strict configuration policy can be in place to ensure a bad-actor with a stolen Snap Sign device would be unable to configure the Snap Sign device for their own network, effectively making the unit useless.

If the configuration file is valid, the QR code display can be changed to a configuration menu where the end-user is asked whether they want to deploy the new network configuration. If elected, the new network configuration can be deployed and tested. Snap Sign only supports network configuration through secure WiFi (modern WPA or newer). Physically, the ethernet port can be concealed by the Snap Sign enclosure for the Raspberry Pi computer.

Versatile Credit provides a secure website where approved retailers can login and create network configuration files that are then digitally signed by Versatile before downloaded to a USB key. This website may require the retailer to enter network credentials into Versatile's site. Optionally, retailers can build their own network configuration file offline. In this method, the retailer would generate a message digest of their configuration file (using SHA-256). Versatile's website would then be used to digitally sign that hash file. Snap Sign verifies the hashcode and the digital signature of that hashcode when the USB storage device is inserted. This method allows Versatile to be unaware of the retailer's network credentials.

Versatile provides remote software updates for Snap Sign devices. Remote software updates provide Versatile the opportunity to strengthen the security of the platform, fix bugs, or update systems software. Versatile's remote update system can include several security features. All software updates can be performed over HTTPS (HTTP over TLS—transport layer security) with full web server certificate validation. Snap Sign does not support SSL/TLS web-proxies.

Snap Sign routinely checks for software updates. Software updates can be downloaded to Snap Sign when they are staged to Versatile's web server. Software updates can be symmetrically encrypted using a shared 256-bit AES key. Additionally, all software updates contained a digitally signed SHA-256 message digest that must be verified before the update can be unencrypted and installed onto the device. Security built into the software update system prevents unauthorized parties from staging and placing new software onto the Snap Sign device and prevents unauthorized parties from having access to the unencrypted Snap Sign software. Snap Sign's network security can be designed to promote secure networking, prevent rogue actors from configuring network services, or having any level of access to staged, remote software updates.

Link Service Security

Snap Sign uses a remote web service, hosted by Versatile, to routinely retrieve lists of web links to display on the screen. These links can be delivered using a traditional REST-based web service. Access to the link service can be permitted only over HTTPS (HTTP using TLS—transport layer security) to ensure secure transmission of the links. Snap Sign is a responsible web client, verifying digital certificates during SSL/TLS negotiation with the web server.

The web service requires the verification of two HTTP headers in order to access the link generation service:

X-Entity-ID: This can be a unique identifier that establishes the identity of a single Snap Sign device. The Entity ID can be represented as a Universally Unique Identifier (UUID v4). The identity identifier can be assigned to each Snap Sign computer when it is first provisioned by Versatile, before it is shipped to the retailer; and X-API-Key: This can be a unique key that allows access to remote services. The API key can be represented as a Universal Unique Identifier (UUID v4). The API key can be granted to the unit when the Snap Sign computer is first provisioned by Versatile, before it is shipped to the retailer.

Whenever a web service call is initiated by Snap Sign, these two headers can be included in the HTTPS request to the web service. Versatile verifies the combination of the Entity ID and the API Key to authenticate and authorize the device to use the service. The API Key can be revoked by Versatile at any time to instantly stop a Snap Sign device from using any Versatile web services. Additionally, the Entity ID can be instantly disabled by Versatile at any time, which would not only prevent future access to Versatile Web Services, but would instantly invalidate all links generated for that device. Access to Versatile's link generation service can be secure and provides Versatile with the capability to revoke access at any time.

Link Security

The web links generated by Snap Sign have the following format:

https://shortdomain.io/TOKEN

For example: https://vtl.credit/_DZC2JjrvrveaNqUSG5-pknjGNB. The TOKEN above can be randomly generated by the Versatile Link Service and can be valid for only a short period of time. The properties of the link service can be configurable to meet the requirements of the lending institution:

Display Time: The amount of time each link is displayed on the screen. Default: 5 seconds.

Padding Time: The amount of time each link may be used after it's display time expires. Default: 30 seconds.

This means that each link can be valid for 35 seconds. Any link presented by Snap Sign 35 seconds after its initial display on the screen would be considered invalid by Versatile.

Every link can be specifically generated with a date and time parameter which instructs exactly when Snap Sign should display the link. For example:

```
{
"url": "http://test.vtl.credit/_lgxJw5BZyL6pSRAq0oT3a9vS",
"start": "2020-03-10T15:49:09.679Z",
"end": "2020-03-10T15:49:14.679Z"
}
```

The tokens in the links can be 25 characters long, and each character has an alphabet consisting of 62 characters (10 numbers and 26 letters—upper and lower case). This makes the effective universe of links 62 25 (equivalent to 148 bits).

These numbers can be large. To put 148 bits into perspective, this means that 1 million computers, each capable of generating 1 million links randomly every second, would take 20 years to regenerate a link that is displayed for 5 seconds on a given Snap Sign.

Links can be generated server-side using a strong Pseudo Random Number Generator (PRNG) based on iterative SHA-256 hashes. The PRNG itself can be seeded from random entropy from Amazon's Key Management System (KMS). The random number generation meets the requirements for FIPS 140-2, Security Requirements for Cryptographic Modules, section 4.9.1.

Finally, links generated by Versatile can be configured so that they can only be used once before being marked invalid. This one-time-use property of links limits the effectiveness of any type of replay attack.

Versatile's link generation strategies ensure global link uniqueness and prevent unauthorized actors from falsely generating links that may be deemed valid by Versatile.

Redirection Security

While generating secure links is important to any such service, it is equally important that the entire validation and redirection process to the self-service financing application also be secure. The entire process to securely redirect a consumer to a self-service credit application is as follows:

1. The consumer scans a Snap Sign QR code using their mobile device.
2. The consumer opens the link embedded in the QR code.
3. The token embedded in the link can be validated by Versatile's Link Server.

The link has to be a valid, generated link, and the web request has to have been made before the link expires.

4. If the link is valid, a server-to-server request can be made to the Credit Application Server, requesting a one-time use application token.
5. The Credit Application Server responds with a one-time application token back to the Link server.
6. The Link Server responds with an HTTP redirect to the Credit Application Server with the embedded one-time application token.
7. The consumer's mobile device follows the redirect to the new URL.
8. The one-time-use application token can be validated by the Credit Application Server.
9. If valid, a new web session can be created and the credit application can be displayed.

It is important to note that the one-time application tokens generated by the Credit Application Server can be generated with the similar random generation processes used by Snap Sign. Securely transitioning the browsing session from the original Snap Sign QR code web link to a secure credit application is a key aspect of the system's design. The server-to-server communication to receive a one-time-use application code prevents a replay attack or a man-in-the-middle attack by a bad actor.

Additional Server Side Protections

Additional server-side protections can be employed to improve the security robustness of the platform. Traditional monitoring and logging technology can be deployed to track unexpected activity from any Snap Sign device. This type of monitoring can include:

API access to request links. These links can be generally requested on a routine interval, such as one per hour. Any abnormal API access outside of this interval will result in notifications to the operations teams at Versatile.

IP address monitoring. Any abnormal IP address changes from the originating devices result in notifications to the operations teams at Versatile.

Event publication and monitoring. Snap Sign publishes activity to the sign back to Versatile's services for full audit and monitoring. Examples of events that are published can include: reboots, system configuration, USB device insertion, staged software update detection and downloads.

As mentioned in the section Link Service Security, API keys and Entity IDs can be revoked by Versatile at any time, effectively deactivating the device. Finally, Versatile can implement IP address white listing to allow only pre-approved IP addresses from accessing the service. Effective monitoring and access control tools provide an extra layer of visibility and security for Versatile Credit and its lending partners.

Embedding Snap Sign

In cases where a retailer does not have access to the physical Snap Sign device, an alternative solution can be made available where Snap Sign software is embedded into an existing device, owned by the retailer. This solution is being promoted by Versatile to help businesses support best contactless practices. Leveraging existing hardware allows retailers to take advantage of contactless technology immediately.

Typically, Versatile embeds Snap Sign technology in the existing Versatile kiosk platform. This solution allows a consumer to walk up to the kiosk to apply for credit and instantly be informed of a new way to apply for credit, on their own mobile device. The Snap Sign rotating QR Code software embedded into the kiosk's Attractor (Welcome) screen would promote this contactless channel.

This technology can also be embedded into other digital platforms, including tablets, point of sales computers, and digital signage systems. This section will examine the security considerations for each of these types of deployments.

Versatile Kiosks

Versatile Kiosks share nearly every aspect of security as the Snap Sign hardware devices and the software running on those devices. Versatile kiosks offer strong physical security with steel enclosures that eliminate access to the computing hardware inside of the device. Versatile floor-standing kiosks can be extremely heavy, eliminating the opportunity for theft by a consumer.

Versatile Kiosk systems software and application software design mirror those of Snap Sign. While the underlying hardware and Linux distribution differs, all of the same security features, design, and discipline has been applied to Versatile's kiosks. The hardware platform for the kiosk is a traditional Intel-based computer (usually an Intel Next Unit of Computing), and the operating system is a version of Linux Slax. The Intel computer boots off internal solid state disk (SSD) storage versus the removable compact flash storage of the Snap Sign Raspberry Pi computer.

Tablets

When deployed on tablets, the Versatile Credit application runs as a web application on the tablet's web browser. This means that the embedding of Snap Sign technology all occurs server-side on Versatile's servers. The rotating QR Code software can be delivered to the tablet through an embedded web page.

The largest security risk can be the theft and control of the tablet computer, with the ability to inspect the HTML being delivered to the tablet browser. This risk can be mitigated by the use of industry-standard software to protect and lock down the tablet device.

Tablets employed in these environments will offer two layers of software:

1. Mobile Device Management (MDM) Software. MDM software allows the retailers to lock down the tablet and controls access to the tablet, even in the event that the tablet is stolen.

2. Kiosk Software. Software is installed on tablets to ensure that the web-based credit applications can be running in an unattended kiosk mode. This software forces the credit application to run full screen, and eliminates the ability for the consumer to gain access or control of the tablet. Kiosk Software typically works in tandem with MDM software to provide a privileged level of access to deliver this type of "locked down" experience. For iOS devices, Versatile deploys Kiosk Pro.

While deployment strategies may vary from retailer to retailer, Versatile generally recommends the following practices for unattended self-service tablets:

1. Enclosures. Using physical enclosures to secure the tablets and eliminate access to ports, power, and other hardware controls.

2. Tethering. Using a physical tether to prevent the removal of the device. Typically, most enclosures can be bolted down to furniture or table tops.

It is important to note that every provisioned tablet uses a unique set of authorization credentials to display the rotating QR Code for Snap Sign software. This means that if a tablet device is compromised (and the MDM software and Kiosk Software is bypassed), Versatile would still have the ability to remotely deactivate the device with the Snap Sign service. The movable nature of tablets may also dictate a requirement for white-listing IP addresses by Versatile or its lending partners.

Point of Sales Computers

Snap Sign technology can be embedded on a retailer's Point of Sales computer. Being the most open of computing environments, the Point of Sales computer would rely more heavily on retailer business practices, IT practices, and security practices. When deployed on a Point of Sales computer, Versatile would embed Snap Sign through web technology. This would involve embedded Snap Sign technology, server-side, into a web-based point of sales system, ERP system, or CRM system. Additionally, Versatile can offer Snap Sign through a web-based login for the retailer on a Versatile hosted web-site. Point of Sales Computers have weakness in that tools exist for a technical, motivated individual to examine HTML and the Document Object Model (DOM) on the computer. If access to an embedded Snap Sign widget is predicated on a static authorization token, there is a risk of theft or loss of this token. Most embedding strategies would involve a server-to-server authentication and generation of a short-lived authentication token to eliminate this risk.

If a server-to-server authentication mechanism is unable to be implemented by the retailer's business systems, then the security of the Point of Sales workstation becomes paramount, including practices such as workstation authentication, virus scanning software, malware detection, and limited end-user access to systems tools on the computer. It is important to note that every provisioned POS system uses a unique set of authorization credentials to display the rotating QR Code for Snap Sign software. This means that if a point of sales device is compromised, Versatile would still have the ability to remotely deactivate the device with the Snap Sign service.

Digital Signage Systems

Digital Signage systems provide the ability to leverage existing signage displays to promote financing and provide the contactless Snap Sign QR Code features within the content being delivered by the digital signage platform. Snap Sign is embedded on digital signage systems through the use of an embeddable web widget that serves up the Snap Sign content in an HTML iFrame. The web widget consists of a URL (web site address) which contains a user access token. This token maps the digital signage appliance to a specific retailer, store, and device. This token grants access to display the rotating QR Code. Digital Signage systems typically offer fairly physical security in that they are large devices that are difficult to steal in the presence of store personnel. They lack input devices such as keyboards and mice. They typically do not have exposed ports accessible to the consumer. Finally, the computing unit is often concealed and inaccessible to the consumer as these units can be embedded in walls or in the ceiling panels.

It is important to note that every digital signage device uses a unique set of authorization credentials to display the rotating QR Code for Snap Sign software. This means that if a digital signage device is compromised, Versatile would still have the ability to remotely deactivate the device with the Snap Sign service.

The invention claimed is:

1. A method of accessing a secure webpage by a user device, the method comprising:
    scanning a first switchable matrix barcode comprising a first Quick Response (QR) code by the user device;
    identifying a first URL sequence unique to the first switchable matrix barcode based on a deconstruction of the first switchable matrix bar code;
    accessing a webpage corresponding to the first URL sequence based at least on whether the accessing occurs within a predefined expiration period of the first URL sequence, wherein the accessing occurs subsequent to the predefined expiration period expiring, and wherein the accessed webpage comprises an access denied webpage;
    scanning a second switchable matrix barcode comprising a second QR code by the user device, wherein the second switchable matrix barcode replaces the first switchable matrix barcode subsequent to the expiration of the predefined expiration period;
    identifying a second URL sequence unique to the second switchable matrix barcode based on a deconstruction of the second switchable matrix barcode; and
    accessing the secure webpage corresponding to the second URL sequence based on the accessing occurring prior to an expiration of a second predefined expiration period.

2. The method of claim 1, wherein the accessing occurs prior to the predefined expiration period expiring, and wherein the accessed webpage comprises the secure webpage.

3. The method of claim 2, wherein the secure webpage further comprises a consumer credit application.

4. The method of claim 1, wherein the first URL sequence comprises at least a first access token for accessing the secure website, and a website address for the secure website.

5. A method of displaying a set of switchable barcodes, the method comprising:
    determining, by a computing device, a set of access tokens for accessing a secure website;
    generating, by the computing device, a first switchable matrix barcode comprising a first Quick Response (QR) code and unique to one of the set of access tokens;
    displaying, via a display, the first switchable matrix barcode for a predefined expiration period;
    determining the predefined expiration time period expires;
    generating a second switchable matrix barcode comprising a second QR code and unique to another of the set of access tokens; and
    displaying, via the display, the second switchable matrix barcode based on the determined expiration.

6. The method of claim 5, wherein determining the set of access tokens comprises:
    receiving the set of access tokens from an external device.

7. The method of claim 5, wherein determining the set of access tokens comprises:
    receiving a seed access token, or a combination of a seed access token and a salt token, from an external device; and
    identifying the set of access tokens from the seed access token or the token combination, and an access token generation process.

8. The method of claim 5, wherein generating the first switchable matrix barcode further comprises:
    embedding a first URL sequence within the first switchable matrix barcode, the first URL sequence comprising at least the first access token and a website address for a secure webpage.

* * * * *